United States Patent [19]

Irwin

[11] Patent Number: 5,288,835
[45] Date of Patent: Feb. 22, 1994

[54] MELT PROCESSABLE POLYESTERS AND POLY(IMIDE-ESTERS)

[75] Inventor: Robert S. Irwin, Wilmington, Del.

[73] Assignee: E. I. Du Pont de Nemours and Company, Wilmington, Del.

[21] Appl. No.: 65,300

[22] Filed: May 21, 1993

[51] Int. Cl.$^5$ .............................................. C08G 63/00
[52] U.S. Cl. ................................. 528/185; 528/182; 528/184; 528/193
[58] Field of Search ................ 528/182, 184, 185, 193

[56] References Cited

U.S. PATENT DOCUMENTS

| | | | |
|---|---|---|---|
| 4,851,495 | 7/1989 | Sheppard et al. | 528/185 |
| 4,861,857 | 8/1989 | Kricheldorf et al. | 528/184 |
| 4,873,371 | 10/1989 | Yeager et al. | 568/33 |
| 4,874,836 | 10/1989 | Wakabayashi et al. | 528/184 |
| 5,068,457 | 11/1991 | Yeager et al. | 568/633 |

Primary Examiner—John Kight, III
Assistant Examiner—Terressa M. Mosley

[57] ABSTRACT

Isotropic polyesters containing a repeat unit derived from 4,4'-bis(3-hydroxyphenoxy)biphenyl, and especially poly(imide-esters) containing that diol, trimellitic anhydride and at least one diamine and/or aminocarboxylic acid. Such polyesters have a good combination of physical and melt properties, making them easy to shape and them useful for mechanical parts and fibers.

17 Claims, No Drawings

MELT PROCESSABLE POLYESTERS AND POLY(IMIDE-ESTERS)

FIELD OF THE INVENTION

Disclosed herein are isotropic polyesters containing monomeric units derived from 4,4'-bis(3-hydroxyphenoxy)biphenyl, particularly poly(imide-esters) with monomer units derived from 4,4'-bis(3-hydroxyphenoxy)biphenyl, trimellitic anhydride and a diamine and/or an aminocarboxylic acid.

TECHNICAL BACKGROUND

Polymers having a combination of high strength and moduli, good high temperature properties, and ease of preparation are always of interest for typical thermoplastic uses, such as molding resins and fibers. Shaped parts and fibers made from these polyesters are useful where good mechanical properties and/or moderate temperature resistance are desired. Disclosed herein are polyesters, particularly poly(imide-esters), which have such properties, and are particularly easy to form into useful shapes by melt processing. These polyesters are based on 4,4'-bis(3-hydroxyphenoxy)biphenyl (herein abbreviated as BHBP) as one of the monomeric units. Polyesters, and especially poly(imide-esters) made with this repeat unit usually have a good balance of good physical properties and melt formability.

U.S. Pat. Nos. 4,873,371 and 5,068,457 describe the preparation of BHBP. Both of these patents state that dihydroxy compounds disclosed therein may be used to prepare liquid crystalline polyesters, while '371 at col. 6, lines 33-39 and '457 at col. 7, lines 21-38 describe liquid crystalline polyesters made from these dihydroxy compounds.

SUMMARY OF THE INVENTION

This invention concerns an isotropic polyester comprising the repeat unit

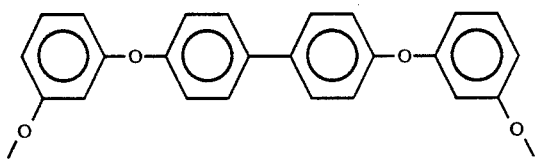

DETAILS OF THE INVENTION

The instant invention deals with polyesters containing BHBP as one of the monomeric units. By polyester herein is meant that BHBP is part of the polymer "backbone" (main chain) and is connected to the polymer backbone through an ester of each of the hydroxyl groups (sometimes nominally) originally present. Other ester groups derived from hydroxyl groups present in other monomeric units may also be present, for example in copolymers. This polyester not only includes polymers that contain only ester linkages joining monomer units, but also includes polymers where other linkages may be present to join monomer units, such as imide, carbonate and amide.

By isotropic herein is meant that in the absence of a shear field the melted polyester will not display anisotropy. In other words, the polyesters herein are not thermotropic liquid crystalline polymers.

The polyesters described herein may be made by a variety of methods known to the artisan, for instance reaction of the diol with acyl halides (usually in the presence of base), the reaction of a bis-ester of a monocarboxylic acid of BHBP with a dicarboxylic acid or its diester, and the reaction of the diol with a diaryl ester of a dicarboxylic acid. These are well known to the artisan. In polymers in which other linkages are used to build the polymer chain (in addition to esters), these may be formed in the usual ways known to the artisan. However, as is known, sometimes care must be exercised in the order in which linking groups are formed.

By repeat units herein are meant groups that are derived from one or more monomeric compounds whose structures are found within the polymer chains (not end groups) at least twice, preferably at least 5 times. Therefore, repeat units in a polyester could be —O—A—O—, which is derived from a diol with a divalent organic radical A, or —(O)C—B—C(O)— which is derived from a dicarboxylic acid with a divalent organic radical B. Alternatively herein, the repeat unit from these two compounds could be represented as —O—A—O—(O)C—B—C(O)—.

Particularly preferred polyesters herein are poly(imide-esters) in which BHBP is connected to the remainder of the monomeric units through ester groups. Imides are often prepared from carboxylic anhydrides, and amines. Especially preferred poly(imide-esters) are those which are made from BHBP, trimellitic anhydride, and one or more diamines and/or one or more aminocarboxylic acids. The poly(imide-esters) may optionally contain minor (of the total molar amount of diols present) amounts of other diols.

Polyesters containing BHBP derived units, particularly poly(imide-esters), including especially preferred compositions, have a particularly good balance of properties in respect to both their use properties (when made into a shaped part) and in their processing (melt) properties. Many of these polyesters are crystalline, with relatively high melting points, so that they can be used at elevated temperatures. However, their melting points are not too high that they decompose before melting. Many of the polymers are tough "solids", even at modest inherent viscosities (as made in the Examples—higher viscosities are possible). Even though their melts were described as "viscous" in the Examples, the viscosity of the polyesters appeared to be low enough so that they could be processed by typical melt forming procedures, such as extrusion and injection molding. Many of the polymers described herein have relatively low melt viscosities at a given molecular weight, which is an advantage in melt processing. Thus fibers and other shaped articles could be readily formed from these polyesters. Since these polyesters are isotropic, they would have essentially the same properties in all directions, an advantage when good properties are needed in more than one direction. Furthermore, liquid crystalline polymers tend to be brittle, while these polyesters were observed to be tough.

Useful diamines in the especially preferred poly(imide-esters) include m-phenylene diamine, 1,4-bis(4-aminophenoxy)benzene, 1,3-bis(4-aminophenoxy)benzene, and 3,4'-oxydianiline. A preferred diamine is 1,4-bis(4-aminophenoxy)benzene. Useful aminoacids include 4-aminobenzoic acid, 3-aminobenzoic acid, and substituted 3-and 4-aminobenzoic acids. A preferred aminoacid is 4-aminobenzoic acid. Useful diols (for copolyesters) include 3,4'-dihydroxydiphenyl ether, 4,4'-dihydroxydiphenyl ether, 3,4'-dihydroxybenzophenone, 4,4'-dihydroxybenzophenone, hydroquinone and monosubstituted (in the ring) hydroquinones. Preferred substituents on the hydroquinone are halogen, alkyl containing 1 to 6 carbon atoms and phenyl.

In the Examples, the following abbreviations are used:
DMAc—N,N-dimethylacetamide
DMF—N,N-dimethylformamide
dpf—denier per filament
DSC—differential scanning calorimetry
gpd—grams per denier
Tg—glass transition temperature
TGA—thermogravimetric analysis
Tm—melting point

EXPERIMENT 1

Synthesis of 4,4'-bis(3-acetoxyphenoxy)biphenyl (I)

(a) Dimethylether of (I)

A flask fitted with stirrer, slow-flow nitrogen blanket, a distillation take-off, and external heating was charged with 4,4'-dibromobiphenyl (498 g; 1.60 mole), 3-methoxyphenol (595 g; 4.8 mole), powdered KOH (179 g; 3.20 mole), and copper powder (18.0 g; "99% purity, for organic reactions", Aldrich). The stirred mixture was slowly heated to 240° C. and held there for 7.5 hr, during which by-product water distilled off. The viscous orange product was combined with 3 liters water containing KOH (270 g) at 25° C. in a blender. The resultant brown precipitate was washed well with water during filtration and dried to give 580 g solid, m.p. 78°–92° C. Extraction with cyclohexane in a Soxhlet apparatus gave an off-white extract, m.p. 94°–99° C. (462 g; 72% yield). The melting point was not changed by crystallization from cyclohexane.

(b) Demethylation to (I)

A slurry, prepared from a combination of components in the following order: 48% aqueous HBr (1300 mL), glacial acetic acid (500 mL), acetic anhydride (500 ml), and dimethylether of (I) (361 g); was heated at reflux for 24 hr to provide a clear, reddish-brown solution, from which a brown solid precipitated on cooling. The mixture was combined with 7 liters ice-water and the precipitate filtered, washed with water, and dried under vacuum. M.p. 152°–8° C. Yield 333 g (99%). Recrystallization from toluene with removal of insolubles from the hot solution before allowing to crystallize, gave a solid, m.p. 155°–8° C. Yield 254 g (76%).

(c) Acetylation of I to (Ia)

A stirred mixture of 340 g of (I) and 1360 mL acetic anhydride was heated at reflux for 3 hr to provide a clear brown solution. On cooling to about 30° C., three drops of concentrated sulfuric acid was added as catalyst and refluxing continued 1 hr further to ensure completion of reaction. The cooled solution was combined with 4 liters ice-water. The separated oil formed a gummy solid on standing 2 days at 25° C. This was separated from the aqueous medium, triturated in a blender with methanol to provide a fine powder which could be filtered, washed and dried at 70° C. under nitrogen. Yield, 345 g, m.p. 84°–99° C. This was dissolved in 2 liters acetic acid at reflux, filtered hot, and cooled to provide a small amount (18 g) of the monoacetate of (I), m.p. 161°–4° C. after crystallization from 10 parts toluene. Concentration of the acetic acid filtrate on a rotary evaporator gave the diacetate of (I) (157 g; m.p. 108°–110° C.), having m.p. 111°–112° C. after crystallization from 1–2 parts toluene. Liquid chromatography indicated purity of 97.6%.

EXAMPLE 1

N-(4-Carboxyphenyl)trimellitimide* (II) was synthesized by the method of Van Strien et al., U.S. Pat. No. 3,377,321 (1967; to Standard Oil Co.).
[*Alternatively: 4-(4-carboxyphthalimido)benzoic acid.]

This was recrystallized from about 4–5 parts by volume of DMF, after treatment with Darco ® and filtration through Celite ®. M.p. by DSC was 383° C.

EXAMPLE 2

Diacid Chloride of N-(4-carboxyphenyl)trimellitimide (III)

50 g (II) was refluxed for 5 hr with 300 mL thionyl chloride. The latter was distilled off. The residue was recrystallized from 10 parts toluene after treating with Darco. The solid, crystallized from the cooled solution in a dry box, was filtered under a nitrogen blanket, washed with toluene, then hexane, on a filter and vacuum dried at 70° C. for 4 hr in the presence of nitrogen. Yield from crystallization 92%, m.p. 169°–170° C.

EXAMPLE 3

N-(3-carboxyphenyl)trimellitimide (IV) was prepared by the procedure of Preston et al., J. Polym. Sci. A-1, 10, 1377–84 (1972). M.p. was 412° C. (lit. 407°–8° C.).

EXAMPLE 4

Diacid chloride of N-(3-carboxyphenyl)trimellitimide (V)

The procedure was as for the 4-isomer, m.p. 191°–4° C. after crystallization from toluene.

EXAMPLE 5

N',N'[1,3-phenylenebis(trimellitimide)] (VI)

m-Phenylenediamine (54 g, 0.5 mole) dissolved in anhydrous DMAc (550 mL) was treated with freshly dried trimellitic anhydride (4 hr/160° C./in vacuo) (192 g, 1.0 mole), and heated with stirring at 135°–140° C. for 2.5 hr. Product crystallized on cooling. The crystallized product was filtered off, washed with water, then methanol, and dried at 120° C. in vacuo. Yield of light brown product, 102 g. A further crop (81 g) of darker brown solid was obtained by precipitating from the DMAc filtrate with water.

EXAMPLE 6

1,4-Phenylene dioxybis[N,N'-(4-phenyltrimellitimide)] (VII)

p-Phenylenedioxy-4,4'-bisaniline (19.2 g; 0.10 mole) was reacted with trimellitic anhydride (38.4 g, 0.20 mole) in refluxing DMF (125 mL) for 2 hr. Product was precipitated into water (500 mL) to provide a light yellow solid (51 g; 82% yield), m.p. 387° C.

EXAMPLE 7

1,3-Phenylenedioxybis[N,N'-(4-phenyltrimellitimide)] (VIII)

m-Phenylenedioxy-4,4'-bisaniline (0.10 mole) was reacted with trimellitic anhydride as in Example 6 to provide 68 g of a light beige product.

EXPERIMENT 2

1,4-Phenylenedioxybis(4-phthalimidobenzoic acid-4) (IX)

1,4-Phenylenedioxybis(4-phthalic anhydride) (15.0 g, 0.0373 mole) in anhydrous DMF was treated with 4-aminobenzoic acid (10.22 g, 0.0746 mole) at reflux for 2 hr. The filtered solution was precipitated by water to provide 17 g product, m.p. 426° C. of 99.4% purity (by DSC).

EXAMPLE 8

3,4'-Bis(trimellitimidophenyl)ether (X)

3,4'-Oxydianiline (100 g; 0.5 mole) in 500 mL anhydrous DMF was treated with trimellitic anhydride (192 g; 1.0 mole). The solution was refluxed 2 hr and after cooling, the clear solution was poured into about 2 liters of cold water to form a yellow precipitate. Yield 265 g.

EXPERIMENT 3

Bis(3-hydroxybenzoylbenzofuran) (XI)

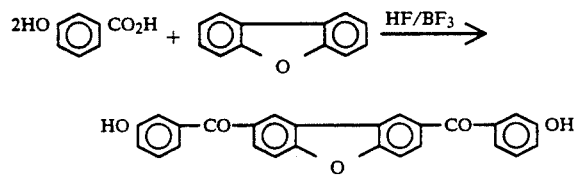

Dibenzofuran (84 g, 0.5 mole), 3-hydroxybenzoic acid (138 g, 1.0 mole), HF (300 mL), and BF$_3$ (190 mL) were shaken at 30° C. for 4 hr. Removal of volatiles left a thick, dark oil which was poured into 1500 mL water to provide a pink solid. This was filtered, washed with water and methanol, then dried at 70°-80° C. Yield 170 g; m.p. 232°-256° C. It was further extracted by hot methyl ethyl ketone to provide 80 g solid, m.p. 259°-266° C.

Diacetate (XII). The diol (above) (5 g) was added to acetic anhydride (400 mL) containing 6 drops sulfuric acid, then refluxed 8 hr. The red solution on cooling afforded a pink crystalline solid. Yield 51 g. M.P. 165°-6° C.

EXPERIMENT 4

N,N'-Bis(3-carboxyphenyl)pyromellitimide (XIII)

Under anhydrous conditions, predried pyromellitic dianhydride (43.6 g, 0.2 mole) was combined with a stirred solution of 3-aminobenzoic acid (54.8 g, 0.4 mole) in 800 mL DMAc. After 1 hr at room temperature to the clear solution was added 80 mL acetic anhydride (100 %excess) followed by 70 mL anhydrous pyridine. Temperature rose to 45° C. and a fine yellow solid began to separate. After stirring 1 hr at ambient temperatures, then 45 min. at 110°-115° C., the solution was cooled, solid filtered off and washed with DMAc and dried in vacuum at 100° C. Yield 91 g.

EXPERIMENT 5

N,N'-Bis(4-carboxyphenyl)carbonyldiphthalimide (XIV)

The preceding procedure was used to react 4-aminobenzoic acid (81 g, 0.6 mole) with benzophenonedianhydride (96.6 g, 0.3 mole) to obtain (XIV) as a yellow powder, m.p. >400° C., yield 159 g.

EXAMPLE 9

Polymer from (IA) and (II)

(a) Melt Polymerization

A round-bottom flask was fitted with an air-driven, single blade glass stirrer, a take-off to a condenser leading to a vacuum pump, an argon inlet bleed, and an external Wood's metal heating bath which may be raised or lowered around the flask. It was charged with 13.76 g (Ia) (0.0303 mole; 1% excess) and 9.300 g (II) (0.0300 mole). The stirred mixture was heated from 230° C. to 325° C. at atmospheric pressure, under a slow flow of argon during 2 hr to form a clear, brown, viscous melt and evolution of acetic acid. Reduction of pressure to 0.10–0.15 mm Hg at 325° C. for a further 1 hr at 325° C. and then to 0.08 mm Hg at 360° C. for a further 0.75 hr gave a highly viscous homogeneous melt. Strong fibers could be drawn from this melt. The cooled polymer was tough, opaque, and grayish-brown. Inherent viscosity was 0.63 dL/g in pentafluorophenol. Tests on a gradient hot bar showed sticking at 286° C. and melting at 345° C. DSC showed Tg=151° C. and a crystalline melting endotherm at 286° C. (31 J/g). During the cooling cycle, crystallization was indicated by an exotherm peak at 221° C. TGA showed incipient weight loss at 425° C. and 100% weight loss at 750° C., under nitrogen, at 10° C./min heat-up rate.

Spinning

A cylindrical plug of the polymer was molded at 270° C. under vacuum during 5 min at 5000 psi. The plug, heated at 370°-395° C., was extruded via mesh screens through a 0.009 in. diameter×0.027 in. length capillary under a pressure of about 3000 psi to a fiber which was wound up at 20 m/min. Fiber had tenacity/elongation/-modulus and denier of 1.3 gpd/50%/25 gpd/87 dpf. This was stretched across a 1" diameter pin heated at 175°-235° C., up to 2.7 times its original length, to provide average property levels of 4.5 gpd/2.7%/210 gpd/28 dpf. (Best break had 5.9 gpd/3.1%/278 gpd.) The low elongation/high modulus was indicative of a substantial degree of molecular orientation. Wide angle X-ray showed medium crystallinity and orientation angle of 20°.

(b) Solution Polymerization o-Dichlorobenzene (163 g, 125 mL) was reduced to 75% volume by distillation to remove traces of moisture. (I) (4.625 g, 0.125 mole), dissolved in the heated solvent, under argon, with stirring, was treated with (III) (4.350, 0.125 mole) and refluxing conducted for 5 hr. Polymer separated from the solution on cooling, was washed with hexane, and dried at 90° C. Inherent viscosity in pentafluorophenol was 0.55 dL/g. DSC showed Tg of about 170° C., crystalline melting at 287° C. (as above), but no true fluidity on a hot bar up to about 460° C. Thus, the slightly higher Tg (170° vs. 151° C. for melt polymer) indicates a degree of adventitious cross-linking in the solution polymer.

EXAMPLE 10

(I)-(III) with 3 Mole % Benzoic Acid End-Capper by Solution Polymerization

The procedure was the same as for the polymer of Example 9(b) except that 0.125 mole (III) was replaced by a combination of 0.121 mole (III) and 0.004 mole benzoyl chloride. Inherent viscosity in pentafluorophenol was 0.57 dL/g. Thermal properties were very similar to Example 9(b).

EXAMPLE 11

Copolymer of [(I)/4,4'-oxydiphenol] (85/18) and (II)

As in Example 9(a), (Ia) (7.72 g, 0.017 mole), 4,4'-oxydiphenol diacetate (0.890 g, 0.003 mole) and (II) (6.22 g; 0.020 mole) were polymerized at 240–325° C. during 150 min. at atmospheric pressure, then at 325°–360° C. during 80 min. at 0.07 mm Hg to provide a brown, viscous clear melt at 360° C., and an opaque tough solid when cooled. Inherent viscosity in pentafluorophenol was 0.64. On a gradient hot bar sticking temperature was 293° C. and melting was complete at 337° C.; fibers were drawn from the melt. DSC showed Tg=137° C. and crystalline melting at 303° C. In TGA incipient weight loss occurred at 440° C.

EXAMPLES 12–16

Copolymers of (Ia)/(II) with 4,4'-oxydiphenol (A), 3,4'-3,4'-Dihydroxybenzophenone (B), and 4,4'dihydroxybenzophenone (C)

Polymerization was carried out as for Example 11. Tough, crystallizable polymers were characterized as follows.

temperature, treated with terephthaloyl chloride (2.540 g; 0.0125 mole) and quinoline (1.0 g) as catalyst, and refluxed 5 hr. The light-colored, fine polymer which separated from the cooled solution was washed with hexane and dried at 90° C. On a gradient hot bar the polymer showed sticking at 225° C. and melting at 322° C.; long shiny fibers were drawn from the viscous melt. Inherent viscosity in pentafluorophenol was 0.60 dL/g. DSC showed crystalline melting at 256° C. (33 J/g) and a pronounced glass transition (Tg) at 149° C. (second heating cycle). TGA showed incipient weight loss at about 400° C.

(b) Melt Polymerization

Using the same procedure as for Example 9, (Ia) (11.58 g, 0.0253 mole; 1.0% excess) and terephthalic acid (4.15 g, 0.00250 mole) was heated progressively from 230° C. to 325° C. during 95 min., with stirring and under a slow flow of argon, to form a clear, rather fluid melt, evolution of acetic acid, and significant sublimate. Heating from 325° C. to 360° C. during 25 min. was combined under reduced pressure of about 1.4 mm Hg to provide a viscous melt which solidified to a clear glass. Inherent viscosity in pentafluorophenol was 0.29 dL/g. DSC showed Tg at 107° C., a sharp crystallization exotherm at 180° C. and melting endotherm at 259° C.

| Ex. No. | Diacetate Comonomer | $\eta_{inh}$ in Pentafluorophenyl | Sticking Temp. | Melt Temp. | Tg | Tm | Initial TGA Wt. Loss | Fiber Formation |
|---|---|---|---|---|---|---|---|---|
| 12 | 25% (A) | 0.90 | 307° C. | 385° C. | 141° C. | 304° C. | 420° C. | Yes |
| 13 | 35% (A) | 0.70 | — | — | 141° | 290° | — | No |
| 14 | 25% (B) | 0.66 | 303° | 391° | 140° | 300° | 150° | Yes |
| 15 | 35% (B) | 0.68 | 225° | 330° | 141° | 312° | 650° | Yes |
| 16 | 25% (C) | 0.69 | 284° | 355° | 134° | 290° | 430° | Yes |

EXAMPLE 17

Polymer from (I) and (IV)

(a) Melt Polymerization

As in Example 11, (Ia) (9.08 g, 0.020 mole) and (IV) (6.22 g, 0.020 mole) were polymerized to a brown glassy, brittle solid having inherent viscosity in pentafluorophenol of 0.31, polymer stick temperature 219° C., melting temperature 270° C.; DSC showed Tg=170° C. and no crystallinity; TGA showed no weight loss up to 400° C.

(b) Solution Polymerization

As in Example 9(a), (I) (4.625 g, 0.0125 mole) was polymerized with (V) (4.350 g, 0.0125 mole) in refluxing o-dichlorobenzene. On cooling a viscous sludge separated. This was triturated with n-hexane to form a tough, fibrous solid with inherent viscosity 0.41 in pentafluorophenol, stick temperature of 280° C., and melt temperature of 380° C. The viscous melt was drawn to a fibrillar, non-crystalline film, stable to beyond 400° C.

EXAMPLE 10

Polyester from (Ia) and terephthalic acid

(a) Solution Polymerization

In a three-necked flask fitted with a distillation head and slow nitrogen purge, o-dichlorobenzene (163 g, 125 mole) was reduced to 75% of its volume by distillation to remove traces of moisture. (I) (diol) (4.625 g, 0.0125 mole) was dissolved in the residual solvent at elevated

EXAMPLE 19

Polymer from (I) and (VI)

(Ia) (9.080 g, 0.020 mole) and (VI) (9.120 g, 0.020 mole) were polymerized as Example 9 by heating at 240°–310° C. during 135 min., then at 310° C./1.4 mm Hg for 30 min. to provide a clear brown, viscous melt which was drawable to long fibers, polymer stick temperature of 214° C. and melt temperature of 254° C. Further heating at 325° C./1.4 mm Hg gave an extremely dark brown, viscous, non-crystallizable polymer, which afforded fairly strong fibers. Polymer stick temperature was now 245° C. and melt temperature 287° C. DSC showed Tg=192° C. and no trace of crystallinity. TGA stability showed incipient weight loss at 400° C. Inherent viscosity was 0.42 in pentafluorophenol.

EXAMPLE 20

Polymer from (I) and (VII)

(Ia) (6.878 g, 0.015 mole) and (VII) (9.600 g, 0.15 mole) were polymerized at 200°–330° C. during 5.5 hr under argon, during which time acetic acid was evolved and the pasty melt changed to a solid. The mixture was cooled, ground to a fine powder and allowed to solid state polymerize with stirring at 315° C./1.3 mm Hg for 4 hr. This had a stick temperature of 323° C. and a melt temperature of 353° C.; fibers were drawn readily from the melt. Additional heating for 3 hr/316° C./0.9 mm Hg raised stick and melt temperatures to 337° C. and 360° C., respectively. DSC showed Tg increased from 179° to 187° C. and crystalline melt temperature from 348° to 353° C. (double melting endotherm at 336° and 353° C.). Inherent viscosity was not determined because degradation occurred in sulfuric acid, the only available solvent. TGA showed thermal stability to beyond 400° C.

EXAMPLE 21

Polymer from (Ia) and (VIII)

As for Example 20, (Ia) (6.81 g, 0.015 mole) and (VIII) (9.60 g, 0.015 mole) was polymerized at 240°-280° C. during 110 min. under argon, then at 280° C. for 270 min. at 0.01 mm Hg. The medium viscosity, dark brown, glass-like polymer stuck at 195° C., melted at 256° C., and readily formed fibers. DSC showed glass transition at 170° C. but no indication of melting. TGA indicated stability to beyond 400° C. Inherent viscosity in pentafluorophenol was 0.44.

EXAMPLE 22

Polymer from (I) and (IX)

(Ia) DAc (5.50 g, 0.012 mole) and IX (7.68 g, 0.012 mole) were polymerized at 240°-350° C. during 3.5 hr. The product was powdered and solid phase polymerized at 280° C./10 hr/1.4 mm Hg. The opaque product stuck at 322° C. and melted at 361° C. to give short, brittle fibers. Tg from DSC was difficult to identify, at about 160° C., but the crystalline melting point was very distinct at 327° C. Inherent viscosity was not determined because of decomposition in sulfuric acid, the only available solvent.

EXAMPLE 23

Polymer from (I) and (X)

(Ia) (9.08 g, 0.02 mole) and (X) (11.96 g, 0.02 mole) were polymerized at 240°-280° C. for 3 hr under argon, then at 280°-300° C. for 2.5 hr at 0.02 mm Hg to give a very viscous, fiber-forming, brown melt, cooling to a clear glassy solid. This stuck at 233° C. and melted at 275° C. Inherent viscosity in pentafluorophenol was 0.32. DSC showed Tg=182° C. but no crystallinity; TGA stability was over 400° C.

COMPARATIVE EXAMPLE 1

Polymer from (XII) and (II)

(XII) (12.300 g, 0.025 mole) and (II) (7.775 g, 0.025 mole) were polymerized at 240°-310° C. for 4 hr, then at 210° C. for 1 hr to give a very viscous liquid, cooling to a glass-like brittle polymer which had a sticking temperature of 244° C. and a melt temperature of 310° C., yielding long fibers from the melt. Inherent viscosity in pentafluorophenol was 0.34. Tg was 215° C. but there was no vestige of crystallinity by DSC. Initial TGA weight loss occurred at about 425° C.

COMPARATIVE EXAMPLE 2

Polymer from (XII) and terephthalic acid (XII) (5.10 g, 0.0125 mole) and terephthaloylchloride (2.538 g, 0.0125 mole) were polymerized in anhydrous DMAc containing 1.0 mL quinoline + 3 mL triethylamine at 100°-110° C. for 1.5 hr. A pinkish-white solid was obtained by precipitation with water. Inherent viscosity in pentafluorophenol was 0.24. It melted at 192° C. to give brittle fibers. Tg was 181° C., but the DSC showed no trace of crystallinity. Incipient weight loss was observed at 250° C.

COMPARATIVE EXAMPLE 3

Polymer from 1,3-phenylenedioxydiphenol and (II)

1,3-Phenylenedioxydiphenyldiacetate (7.71 g, 0.02 mole) was polymerized with (II) (6.22 g, 0.02 mole) and was polymerized at 240°-364° C. for 100 min., then at 364° C. for 10 min. to give polymer with sticking temperature of 326° C. and melting >420° C. The melt showed shear opalescence. $\eta_{inh}$ in pentafluorophenol was 0.93. DSC showed Tg=141° C., Tm ~316° C., and crystallization maximum at 218° C., on cooling.

COMPARATIVE EXAMPLE 4

Melt polymerization of 1,3-phenylenedioxydiphenyldiacetate and (IV) gave polymer of $\eta_{inh}$=0.73 in pentafluorophenol, with sticking temperature of 221° C., melting temperature of 342° C. Short fibers could be pulled from the melt. The clear, tough polymer showed no evidence of crystallinity. Tg=163° C.

COMPARATIVE EXAMPLE 5

Reaction in the melt of 1,3-phenylenedioxydiphenyl diacetate and terephthalic acid at up to 348° C./1.1 mm Hg gave an extremely viscous, readily fiber-forming melt which cooled to a tough, dark brown, clear polymer of inherent viscosity 0.57 in pentafluorophenol, stick temperature of 233° C., and melt temperature of 280° C. In a second experiment when polymer was polymerized to 330° C., it solidified and crystallized from the melt: inherent viscosity 0.45; sticking temperature 303° C.; melting temperature 325° C. Fiber-forming though brittle. DSC showed high crystallinity with Tm 296°, 327° C. (double peak) and no Tg.

COMPARATIVE EXAMPLE 6

Oxybis(4,4'-benzoyl-3-phenol)diacetate (9.98g, 0.02 mole) and (II) (6.22 g; 0.02 mole) were polymerized at 240°-340° C. during 150 min., then at 340°-360° C. at 1.4 mm Hg during 25 min. to give viscous, fiber-forming, clear, brown resin with a sticking temperature of 263° C. and melting temperature of 293° C. DSC showed Tg=172° C. and no crystallinity.

COMPARATIVE EXAMPLE 7

Polyterephthalate from oxybis(4,4'-benzoyl-3-phenol)

This was a clear, brittle polymer, with $\eta_{inh}$=0.39 (in pentafluorophenol), readily fiber-forming, with a stick temperature of 168° C., melting temperature of 208° C., and high viscosity. DSC showed Tg=125° C. and no crystallinity.

COMPARATIVE EXAMPLE 8

Polymer of (I) with N,N'-bis(3-carboxyphenyl)pyromellitimide (Ia) (8.17 g, 0.018 mole) and N,N'-bis(3-carboxyphenyl)pyromellitimide (8.28 g; 0.018 mole) were melt polymerized at 200°-320° C. under argon for 3.5 hr, then at 318° C. at 0.02 mm Hg for 3 hr. The product was a brown opaque brittle solid, although intermediately it had been an opaque viscous liquid. It did not melt below 400° C.

COMPARATIVE EXAMPLE 9

Polymer from (I) with
N,N'-bis(4-carboxyphenyl)carbonyldiphthalimide

The combination of (Ia) (9.08 g, 0.02 mole) with N,N'-bis(4-carboxyphenyl)carbonyldiphthalimide (11.20 g, 0.02 mole) gave a grayish-brown solid, melting above 400° C.

What is claimed is:

1. An isotropic polyester comprising the repeat unit

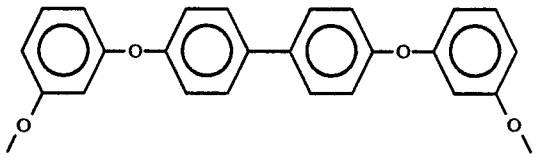

2. The isotropic polyester as recited in claim 1 which is a poly(imide-ester).

3. The isotropic polyester as recited in claim 2 which has repeat units derived from trimellitic anhydride and one or more diamines, aminocarboxylic acids, or diamines and aminocarboxylic acids.

4. The isotropic polyester as recited in claim 3 wherein said diamine is m-phenylene diamine, 1,4-bis(4-aminophenoxy)benzene, 1,3-bis(4-aminophenoxy)benzene, or 3,4'-oxydianiline.

5. The isotropic polyester as recited in claim 3 wherein said aminocarboxylic acid is 4-aminobenzoic acid or 3-aminobenzoic acid.

6. The isotropic polyester as recited in claim 3 wherein said diamine is m-phenylene diamine, 1,4-bis(4-aminophenoxy)benzene, 1,3-bis(4-aminophenoxy)benzene, or 3,4'-oxydianiline, and said aminocarboxylic acid is 4-aminobenzoic acid or 3-aminobenzoic acid.

7. The isotropic polyester as recited in claim 3 which is a copolyester containing a minor amount of one or more other diols.

8. The isotropic polyester as recited in claim 7 wherein said diol is one or more of 3,4'-dihydroxydiphenyl ether, 4,4'-dihydroxydiphenyl ether, 3,4'-dihydroxybenzophenone, 4,4'-dihydroxybenzophenone, hydroquinone or a monosubstituted hydroquinone.

9. The isotropic polyester as recited in claim 4 which is a copolyester containing a minor amount of one or more other diols.

10. The isotropic polyester as recited in claim 9 wherein said diol is one or more of 3,4'-dihydroxydiphenyl ether 4,4'-dihydroxydiphenyl ether, 3,4'-dihydroxybenzophenone, 4,4'-dihydroxybenzophenone, hydroquinone or a monosubstituted hydroquinone.

11. The isotropic polyester as recited in claim 5 which is a copolyester containing a minor amount of one or more other diols.

12. The isotropic polyester as recited in claim 11 wherein said diol is one or more of 3,4'-dihydroxydiphenyl ether, 4,4'-dihydroxydiphenyl ether, 3,4'-dihydroxybenzophenone, 4,4'-dihydroxybenzophenone, hydroquinone or a monosubstituted hydroquinone.

13. The isotropic polyester as recited in claim 1 in the form of a fiber.

14. The isotropic polyester as recited in claim 1 in the form of a film.

15. The isotropic polyester as recited in claim 1 in the form of a shaped article.

16. The isotropic polymer as recited in claim 4 wherein said diamine is 1,4-bis(4-aminophenoxy)benzene.

17. The isotropic polymer as recited in claim 5 wherein said aminoacid is 4-aminobenzoic acid.

* * * * *